(12) United States Patent
Huang

(10) Patent No.: US 7,124,854 B2
(45) Date of Patent: Oct. 24, 2006

(54) TRANSMISSION DEVICE OF VEHICLE

(76) Inventor: Jui Tien Huang, No. 26, Yung Yu Rd., Yung Hsing Tsun, Yung Ching Hsiang, Changhua Hsien (TW)

( * ) Notice: Subject to any disclaimer, the term of this patent is extended or adjusted under 35 U.S.C. 154(b) by 159 days.

(21) Appl. No.: 10/660,597

(22) Filed: Sep. 12, 2003

(65) Prior Publication Data

US 2005/0056479 A1    Mar. 17, 2005

(51) Int. Cl.
  *B60K 17/04* (2006.01)
(52) U.S. Cl. ..................................................... 180/371
(58) Field of Classification Search ................ 180/342, 180/343, 371, 372, 377, 379, 381; 280/432; 74/412 R, 413
  See application file for complete search history.

(56) References Cited

U.S. PATENT DOCUMENTS

| | | | | |
|---|---|---|---|---|
| 1,166,246 A | * | 12/1915 | Olson | 301/1 |
| 1,173,064 A | * | 2/1916 | Twiford | 475/331 |
| 1,181,079 A | * | 4/1916 | Kelso | 74/355 |
| 2,182,417 A | * | 12/1939 | Waller | 180/363 |
| 2,399,778 A | * | 5/1946 | Wike | 180/10 |
| 2,529,330 A | * | 11/1950 | Double | 475/337 |
| 3,315,757 A | * | 4/1967 | Schlosser | 180/340 |
| 3,782,215 A | * | 1/1974 | Moody | 74/410 |
| 3,995,709 A | * | 12/1976 | Gil | 180/368 |
| 4,352,406 A | * | 10/1982 | Fahrenschon | 180/308 |
| 5,558,174 A | * | 9/1996 | Avitan et al. | 180/60 |
| 6,182,588 B1 | * | 2/2001 | Bodie et al. | 111/174 |
| 7,025,555 B1 | * | 4/2006 | Hanig | 414/326 |

\* cited by examiner

*Primary Examiner*—Paul N. Dickson
*Assistant Examiner*—Laura B. Rosenberg
(74) *Attorney, Agent, or Firm*—Troxell Law Office, PLLC

(57) ABSTRACT

A transmission device of a vehicle is equipped with a shaft, a driven wheel with internal gear teeth defined thereon mounted to the shaft center thereof, and a small driving gear with outer gear teeth defined thereon in mesh with the internal gear teeth of the driven wheel wherein, depending on the position of the shaft, the small driving gear is located at the offset center of the driven wheel therein to serve as a main source of power supply. When the small driving gear, carrying the total weight and load of the vehicle, is rotated forwards and upwards at the driven wheel therein in eccentric manner, the outer gear teeth of the small driving gear tend to climb upwards therewith along the internal gear teeth of the driven wheel thereof to rotate the driven wheel therewith, effectively converting the gravity force into dynamic driving power to reduce the output of power requirement for more efficient and economical use thereof. Besides, a limiting device with damping springs is disposed at one side of the driven wheel to keep the small driving gear located at one half of the driven wheel in eccentric gearing and maintain the output of gravity force in transmission.

2 Claims, 4 Drawing Sheets

TRANSMISSION DEVICE OF VEHICLE

BACKGROUND OF THE INVENTION

The present invention is related to a transmission device for vehicles, including a shaft, a driven wheel with internal gear teeth defined thereon mounted to the shaft center thereof, and a small driving gear with outer gear teeth defined thereon in mesh with the internal gear teeth of the driven wheel thereof wherein the small driving gear is located at the offset center of the driven wheel therein to serve as a source of power supply. When the small driving gear, carrying the total weight and load of the vehicle, is rotated upwards at the driven wheel therein in internal offset gearing, the outer gear teeth of the small driving gear tend to climb forwards therewith along the internal gear teeth of the driven wheel thereof to rotate the driven wheel therewith, effectively converting the gravity force into dynamic driving power to reduce the output of power requirement for more economical and efficient use thereof.

Please refer to FIG. 1. A conventional transmission device of a vehicle is made up of a vehicle 10 having a shaft 11, a driven wheel 13 mounted to the outer periphery of the shaft 11 thereof, and a wheel 12 attached to the outer periphery of the driven wheel 13 thereon. In operation, the vehicle 10 is started to rotate the shaft 11 and the driven wheel 13 therewith synchronically so as to move the wheel 12 in driving motion. Meanwhile, the output of power requirement is uneconomically multiplied in the process, which makes the conventional transmission device of a vehicle rather inefficient in practical use.

SUMMARY OF THE PRESENT INVENTION

It is, therefore, the primary purpose of the present invention to provide a transmission device of a vehicle, including a vehicle having a shaft, a driven wheel with internal gear teeth defined thereon mounted to the shaft center thereof, and a small driving gear with outer gear teeth defined thereon in mesh with the internal gear teeth of the driven wheel thereof wherein the small driving gear, carrying the total weight and load of the vehicle, is located at the offset center of the driven wheel therein to serve as a source of offset power supply. When the small driving gear is rotated forwards and upwards at the driven wheel therein, the outer gear teeth of the small driving gear tend to climb forwards therewith along the internal gear teeth of the driven wheel thereof in internal offset gearing to rotate the driven wheel therewith, effectively converting the gravity force into dynamic driving power to reduce the output of power requirement for more economical and efficient use thereof.

It is, therefore, the secondary purpose of the present invention to provide a transmission device of a vehicle wherein a limiting device with damping springs is disposed at one side of the driven wheel thereof. When the output of driving force is cut or reduced, the small driving gear will sink downwards for the limiting device to lift upwards till abutted against the damping springs disposed at both sides thereof to absorb shock in braking. Otherwise, when the limiting device is descended to a limited position, the main driving gear will stop from the upwards offset motion, refraining from being rotated to the other half of the driven wheel thereof and thus lost the effect of gravity transmission thereof.

DETAILED DESCRIPTION OF THE PREFERRED EMBODIMENTS

Figure 1:
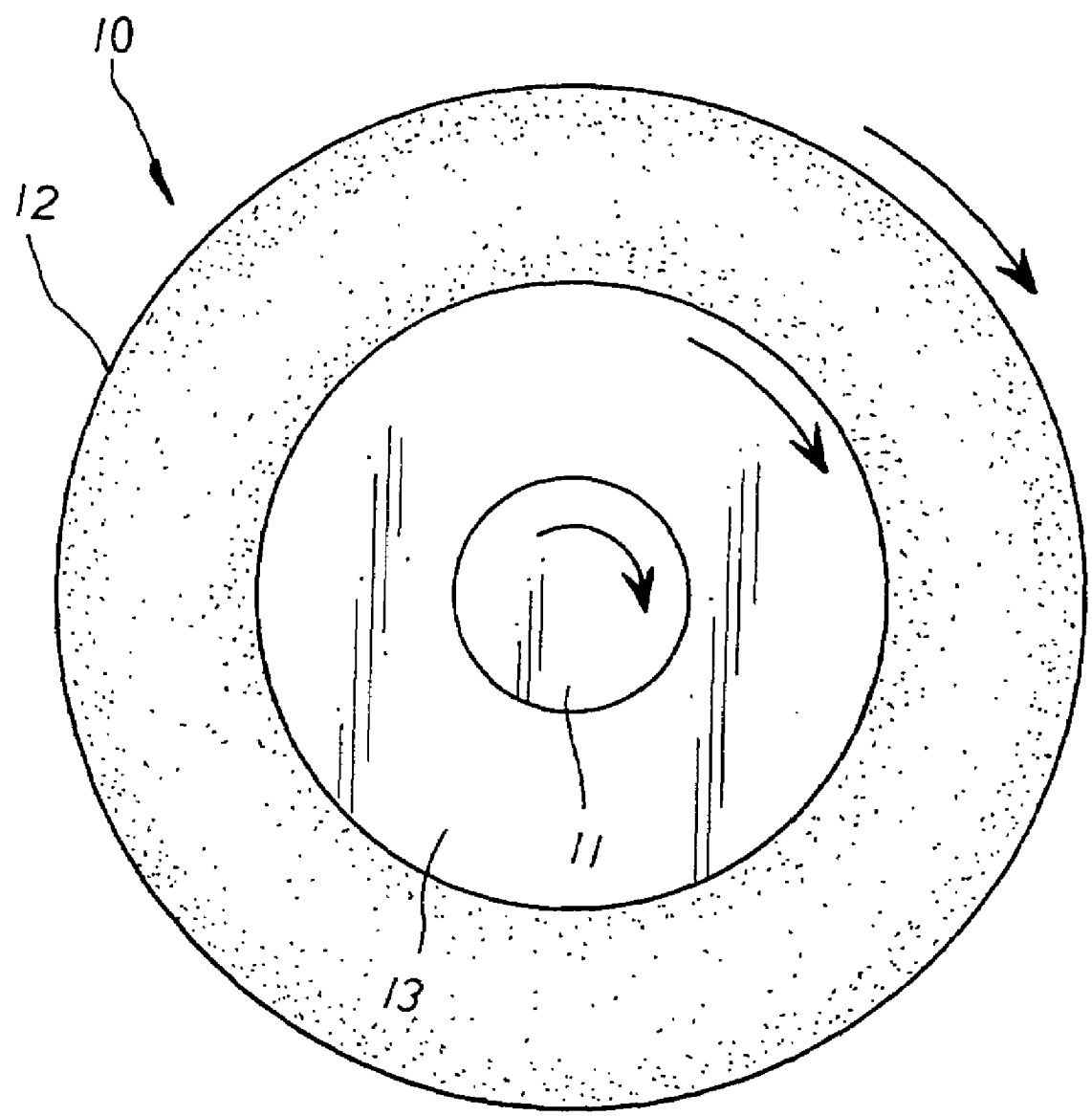
FIG. 1 is a sectional view of a conventional transmission device of a vehicle in operation.
Figure 2:
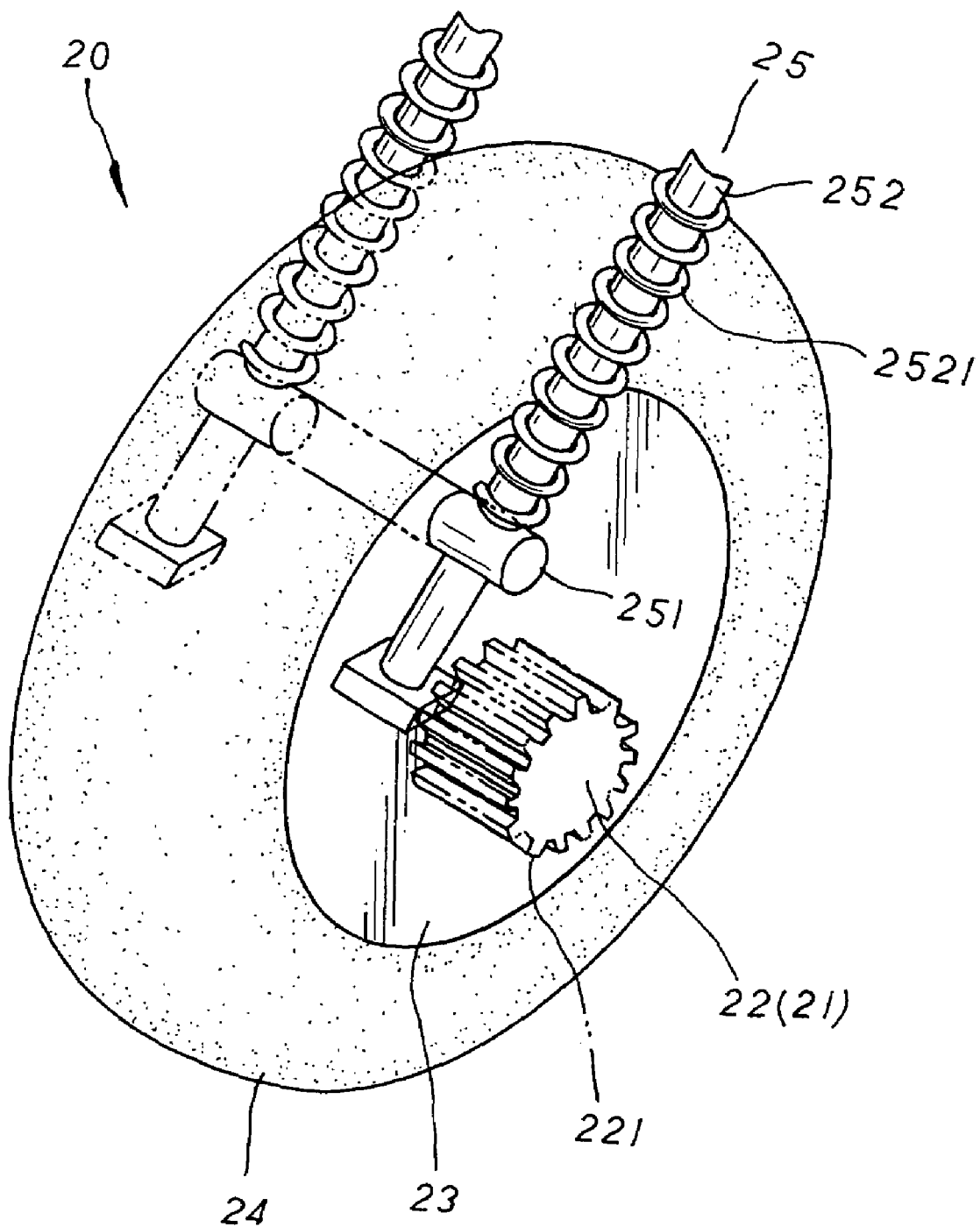
FIG. 2 is a perspective view of the present invention in assembly.
Figure 3:
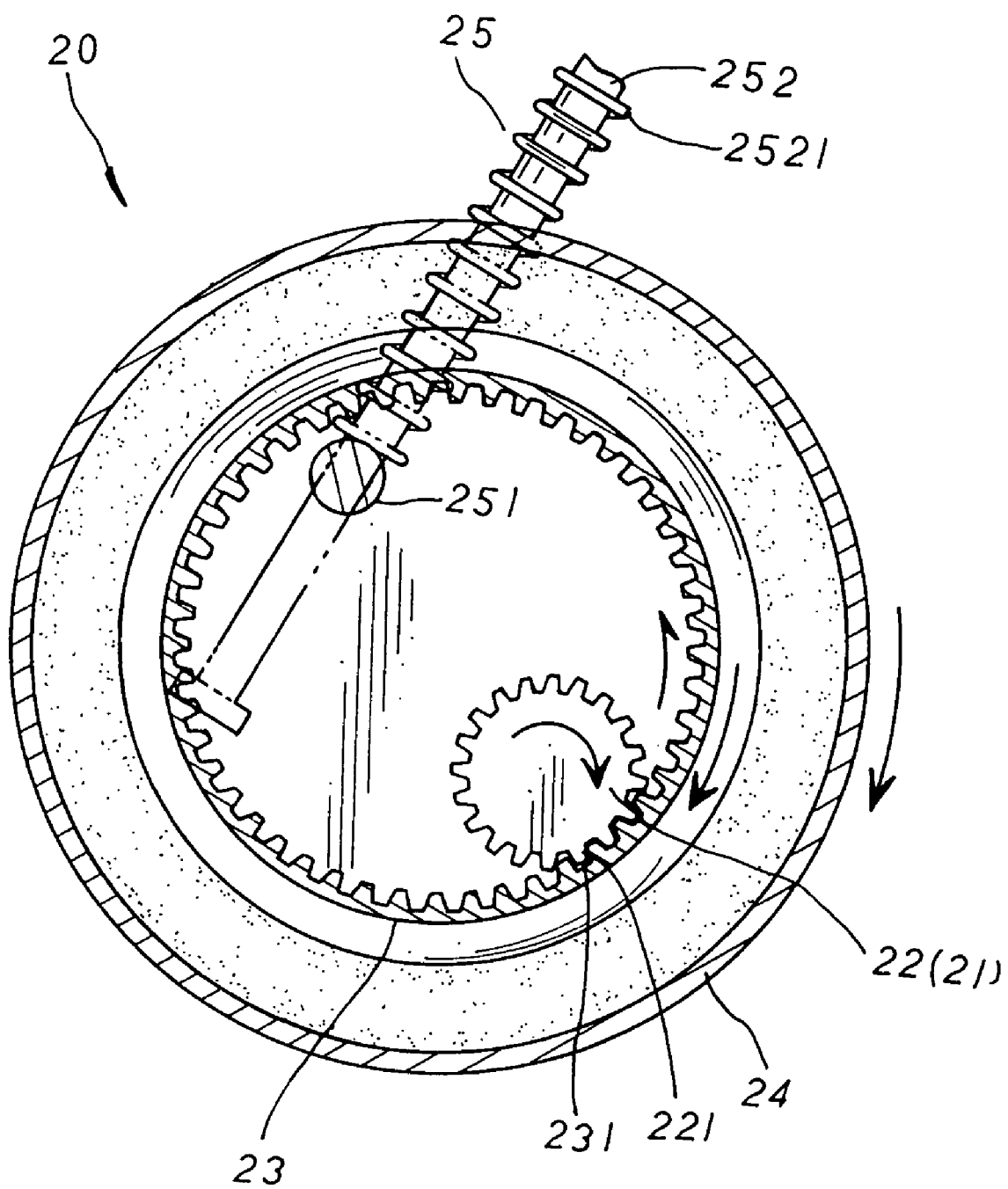
FIG. 3 is a sectional view of the present invention in operation.

Please refer to FIGS. 2, 3. The present invention is related to a transmission device of a vehicle, including a vehicle 20 having a shaft 21, a driven wheel 23 with internal gear teeth 231 defined thereon mounted to the center of the shaft 21 thereof, and a small driving gear 22 with outer gear teeth 221 defined thereon in mesh with the internal gear teeth 231 of the driven wheel 23 thereof. The small driving gear 22 is the main source of power supply to rotate the driven wheel 23 via gravity transmission instead of the conventional torsion transmission. Depending on the position of the shaft 21, the small driving gear 22 is located at the offset center of the driven wheel 23 therein to form an offset gravity gearing thereof. When the small driving gear 22, carrying the total weight and load of the vehicle 20, is rotated forwards and upwards at the driven wheel 23 therein, the outer gear teeth 221 of the small driving gear 22 tend to climb forwards therewith along the internal gear teeth 231 of the driven wheel thereof in internal offset gearing. Thus, the gravity force loaded on the small driving gear 22 due to the whole weight of the vehicle 20 is transmitted to the driven wheel 23 in rotating motion, effectively converting the gravity force thereof into dynamic driving power thereof to reduce the output of power requirement for more economical and efficient use thereof. When the outer gear teeth 221 of the small driving gear 22 are moved forwards and upwards in eccentric gearing, the gravity center of the driven wheel 23 is shifted therewith, driving a wheel 24 of the vehicle 20 to move forwards in rolling manner as shown in FIG. 3.

Figure 4:
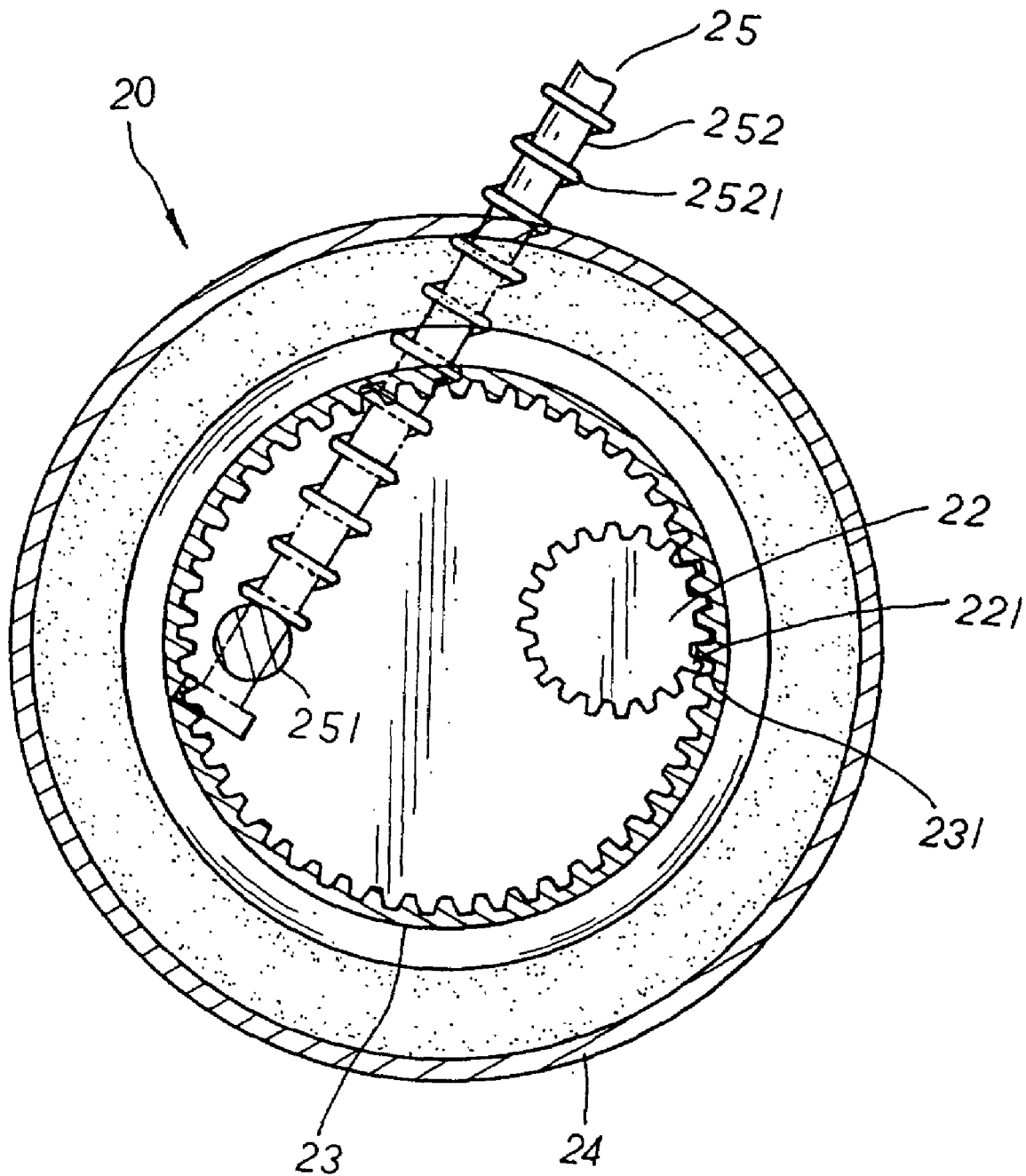
FIG. 4 is a diagram showing a small driving gear and a limiting device of the present invention stopped from the uplifting or descending motion at a limited position.

Please refer to FIG. 4. A limiting device 25 is disposed at one side of the driven wheel 23 to keep the small driving gear 22 located at one half of the driven wheel 23 in eccentric gearing and maintain the output of gravity force in transmission. The limiting device 25 is made up of a transverse rod 251, a pair of limiting rods 252 symmetrically joined at both ends of the transverse rod 251 thereof respectively, and a damping spring 2521 led through each limiting rod 252 thereof. When the output of driving force is cut or reduced, the small driving gear 22 will sink downwards for the transverse rod 251 of the limiting device 25 to lift upwards till abutted against the damping springs 2521 disposed at both ends of the limiting rods to absorb shock in braking. Otherwise, when the output of driving force is augmented, the small driving gear 22 will climb upwards for the transverse rod 251 of the limiting device 25 thereof to descend on the other side thereof. When the limiting device 25 is descended to a limited bottommost position, the small driving gear 22 will stop from the upwards offset movement, refraining from being rotated to the other half of the driven wheel 23 thereof and thus lost the effect of gravity transmission thereof.

What is claimed is:

1. A transmission device of a vehicle comprising: a vehicle having a shaft, a driven wheel with internal gear teeth defined thereon mounted to a shaft center thereof, and a small driving gear with outer gear teeth defined thereon meshing with the internal gear teeth of the driven wheel, the small driving gear is movable upwardly and downwardly relative to the driven wheel, wherein, depending on the position of the shaft, the small driving gear is located at an offset center of the driven wheel therein to serve as a main source of offset power supply; when the small driving gear, carrying the total weight and load of the vehicle, is rotated forwards and upwards relative to the driven wheel, the outer gear teeth of the small driving gear climb forwards along the internal gear teeth of the driven wheel in internal offset gearing to rotate the driven wheel therewith, converting a gravity force thereof into dynamic driving power.

2. A transmission device of a vehicle comprising: a vehicle having a shaft, a driven wheel with internal gear teeth defined thereon mounted to a shaft center thereof, and a small driving gear with outer gear teeth defined thereon meshing with the internal gear teeth of the driven wheel, the small driving gear is movable upwardly and downwardly relative to the driven wheel, wherein, depending on the position of the shaft, the small driving gear is located at an offset center of the driven wheel therein to serve as a main source of offset power supply; when the small driving gear, carrying the total weight and load of the vehicle, is rotated forwards and upwards relative to the driven wheel, the outer gear teeth of the small driving gear climb forwards along the internal gear teeth of the driven wheel in internal offset gearing to rotate the driven wheel therewith, converting a gravity force thereof into dynamic driving power thereof, wherein a limiting device is disposed at one side of the driven wheel to keep the small driving gear located at one half of the driven wheel in eccentric gearing and maintaining an output of gravity force in transmission; the limiting device has a transverse rod, a pair of limiting rods symmetrically joined at both ends of the transverse rod thereof respectively, and a damping spring led through each limiting rod.

* * * * *